United States Patent
Tang et al.

(10) Patent No.: US 11,235,676 B2
(45) Date of Patent: Feb. 1, 2022

(54) COMBINED CONVERTER CIRCUIT

(71) Applicant: KARMA AUTOMOTIVE LLC, Irvine, CA (US)

(72) Inventors: Lixin Tang, Irvine, CA (US); Geng Niu, Irvine, CA (US); Harshith Kulai, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 289 days.

(21) Appl. No.: 16/446,417

(22) Filed: Jun. 19, 2019

(65) Prior Publication Data
US 2020/0398686 A1  Dec. 24, 2020

(51) Int. Cl.
| | |
|---|---|
| *H02J 7/04* | (2006.01) |
| *H02J 7/16* | (2006.01) |
| *B60L 53/20* | (2019.01) |
| *H02M 3/337* | (2006.01) |
| *H02M 3/158* | (2006.01) |
| *B60L 53/53* | (2019.01) |
| *H02M 3/335* | (2006.01) |
| *H02M 1/00* | (2006.01) |

(52) U.S. Cl.
CPC ............... *B60L 53/20* (2019.02); *B60L 53/53* (2019.02); *H02M 3/1582* (2013.01); *H02M 3/3376* (2013.01); *H02M 3/33507* (2013.01); *B60L 2210/12* (2013.01); *B60L 2210/14* (2013.01); *H02M 1/0058* (2021.05)

(58) Field of Classification Search
USPC ........................................ 320/140, 141, 142
See application file for complete search history.

(56) References Cited

U.S. PATENT DOCUMENTS

| | | | |
|---|---|---|---|
| 7,012,822 B2 | 3/2006 | Zhu et al. | |
| 9,061,595 B2 | 6/2015 | King et al. | |
| 2012/0299378 A1* | 11/2012 | King .................. | H02M 3/1582 307/18 |
| 2015/0029666 A1 | 1/2015 | Kosuga et al. | |
| 2017/0005565 A1* | 1/2017 | Bai .......... | H02M 1/12 |
| 2018/0278168 A1* | 9/2018 | Brown .................. | B60L 53/24 |

FOREIGN PATENT DOCUMENTS

| | | |
|---|---|---|
| CN | 102025182 B | 10/2012 |
| WO | WO-2019199964 A1 * 10/2019 | .............. B60L 53/22 |

OTHER PUBLICATIONS

V. Krithika et al.; "Multi Bus DC-DC Converter in Electric Hybrid Vehicles"; Journal of Physics: Conference Series vol. 1000; National Conference on Mathematical Techniques and its Applications (NCMTA 18); Jan. 6, 2018; pp. 1-12.
International Search Report and Written Opinion dated Oct. 16, 2020 issued in related International PCT Application No. PCT/US2020/03855; filed Jun. 18, 2020.

* cited by examiner

*Primary Examiner* — Brian Ngo
(74) *Attorney, Agent, or Firm* — Gordon Rees Scully Mansukhani, LLP

(57) ABSTRACT

A combined bi-directional converter and an auxiliary power module circuit for an 800V battery of an electric vehicle. The converter providing a stepped voltage of 400V with a duty ratio of 50 percent. The combined circuit comprises a high voltage side and a low voltage side. A transformer provides an interface between the high voltage side and the low voltage side. The combined circuit comprises a buck and boost mode.

17 Claims, 5 Drawing Sheets

COMBINED CONVERTER CIRCUIT

GENERAL DESCRIPTION

The present disclose relates generally to the field of electric vehicles (EVs) systems. More specifically, this disclosure relates to an Auxiliary Power Module (APM) including a combined bi-directional converter for a low voltage battery, typically a 11V to 15V battery for automotive accessories.

Most current electric vehicles use 300V to 400V DC batteries as the primary power source. Batteries rated in this range are often referred to as high voltage (HV) batteries. Typically, a low voltage (LV) battery (e.g., a 12V battery) is used to provide power for the vehicle's accessories. In order to move power between the HV and LV batteries, for example, to charge the 12V battery from a high voltage DC bus, a HV to LV DC/DC converter is needed. This DC/DC converter is typically contained within or referred to as an Auxiliary Power Module (APM). In certain situations, the 12V battery can be used to charge the HV battery. Such a situation may arise if, for example, another power source (e.g., a solar panel) is provided power to the LV battery or LV DC bus.

For electric vehicles that require more power, it may be preferred to employ an 800V battery, which can introduce advantages such as reduced wire size, faster charging time, lower system loses, lower weight and lower volume due to the reduced wire size.

Accordingly, an object of the present disclosure is to provide a cost effective, space efficient, and low weight combined converter system for an 800V battery pack.

BRIEF DESCRIPTION OF THE DRAWINGS

The features, aspects, and advantages of the present invention will become apparent from the following description, and the accompanying exemplary embodiments shown in the drawings, which are briefly described below.

DETAILED DESCRIPTION

As disclosed herein, a combined converter circuit for an electric vehicle is provided. The combined converter circuit includes a bi-directional converter circuit configured to convert voltage from a high voltage power bus connected to a main battery of the electric vehicle to a reduced or stepped down voltage corresponding to an auxiliary battery or auxiliary power bus. An auxiliary power module may include the bi-directional converter circuit, wherein the auxiliary power module is configured to convert power provided by the main battery to a low voltage bus providing power to accessories.

According to one embodiment of the disclosure, an Auxiliary Power Module (APM) includes an 800/400 v converter. At least two high voltage side power switches can be eliminated in this innovative integrated configuration. A conventional configuration would provide an APM with a 400/12 v converter and a separate 800/400 v DC/DC converter. The disclosed configuration reduces the system cost, volume, and weight.

Figure 1:
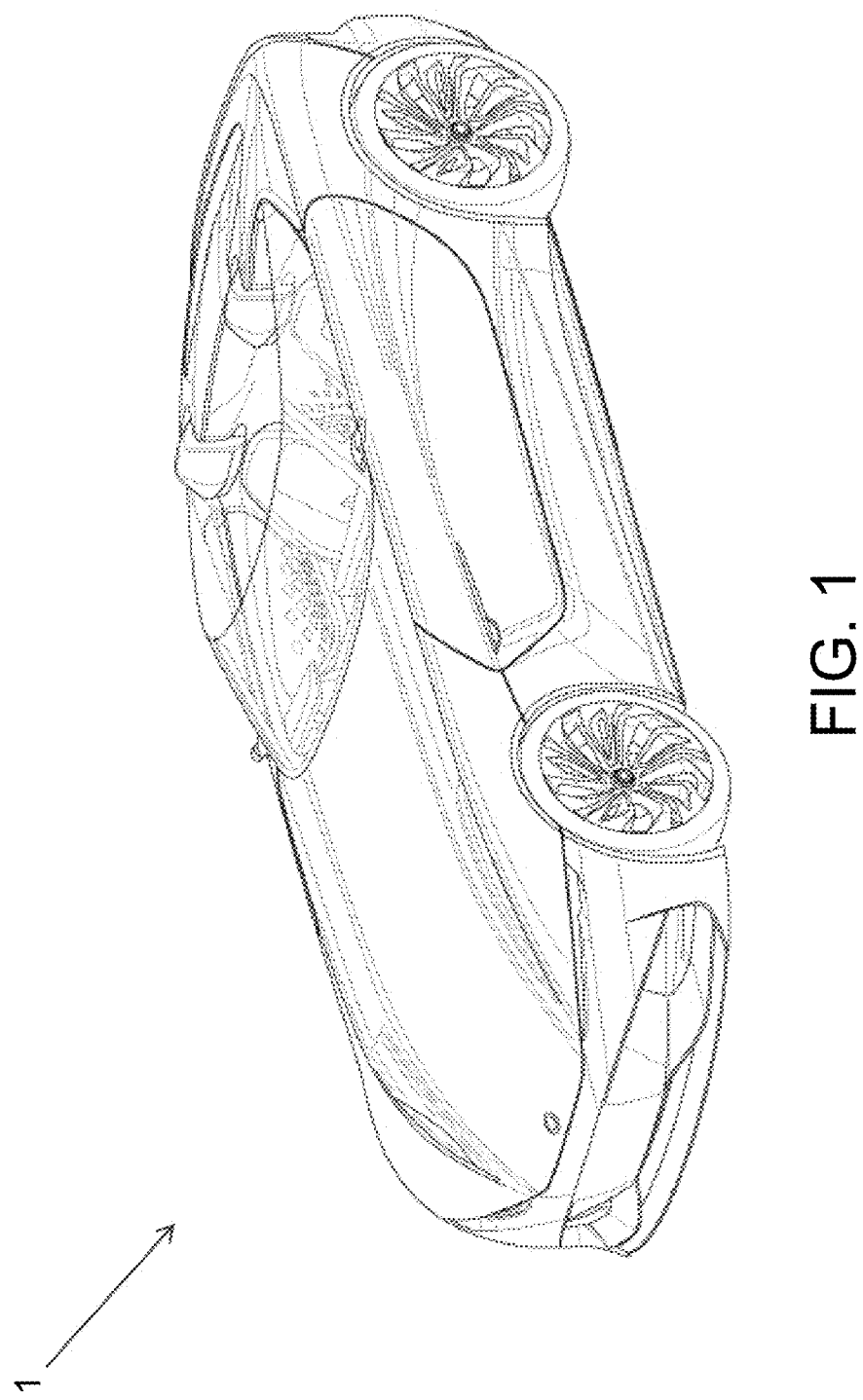
FIG. 1 is an electric vehicle comprising an propulsion motor.

FIG. 1 shows an electric vehicle 1 with propulsion motor(s) (not shown). The propulsion motor is powered by a main battery (not shown) and may also include an APM (not shown) to provide power to the vehicle's accessories. The APM converts the main battery voltage to a lower accessory battery voltage.

Figure 2A:
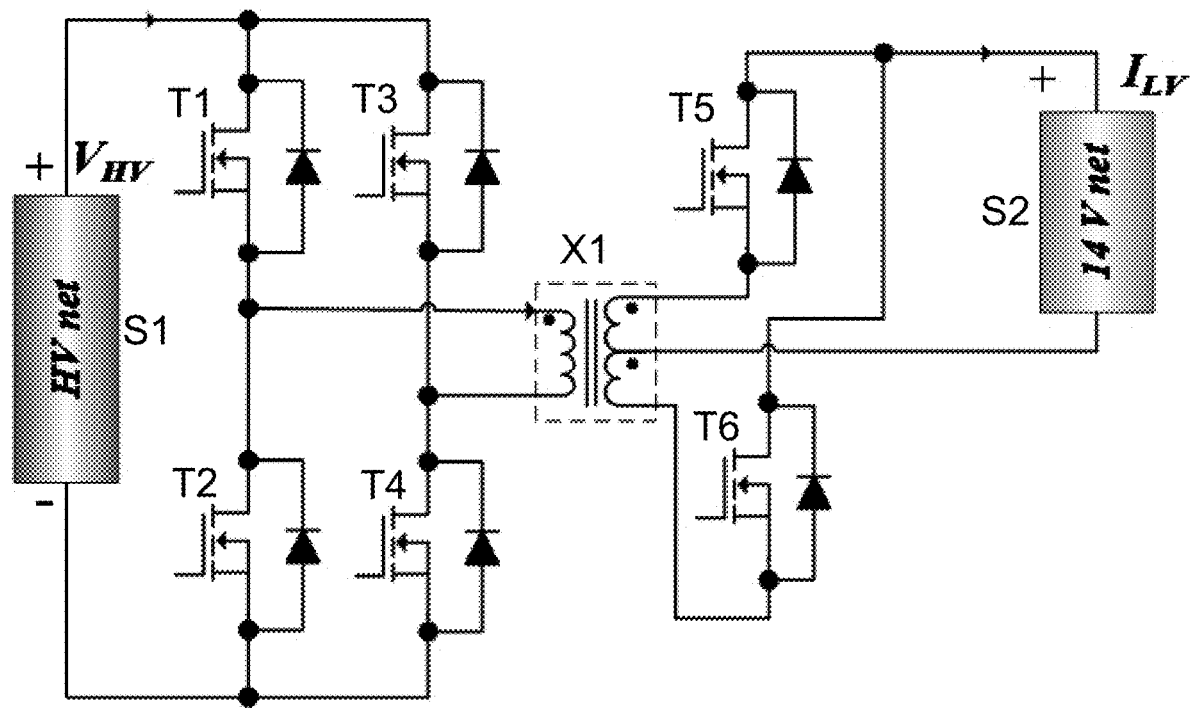
FIG. 2A/2B are circuit diagrams showing a conventional APM including a buck/boost converter
Figure 2B:
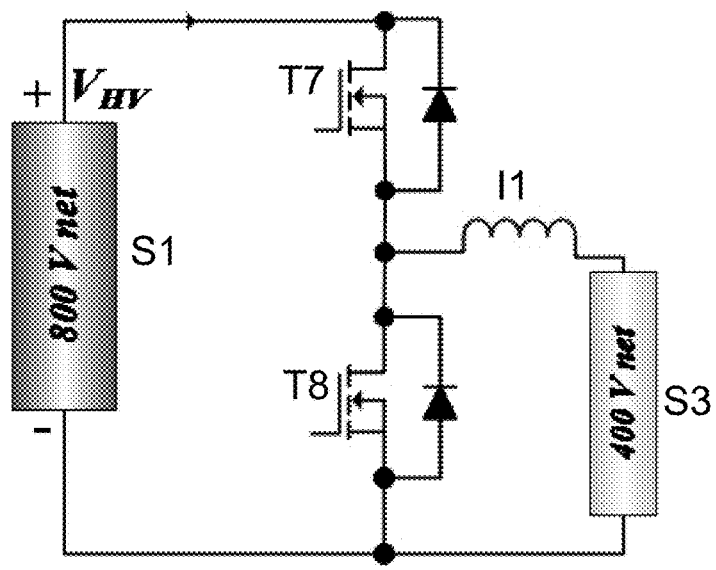

FIGS. 2A and 2B illustrates a circuit diagram of a conventional APM (FIG. 1A) that would also need to include a separate buck/boost converter (FIG. 1B) in order to provide for conversion between 800 v and 400 v. At least eight power switches T1-T8 would be required for both systems to operate both the APM and the separate high voltage converter. In an alternative embodiment a power diode may be provided in place of the T8 switch in order to save cost when only buck mode operation is required.

Figure 3:
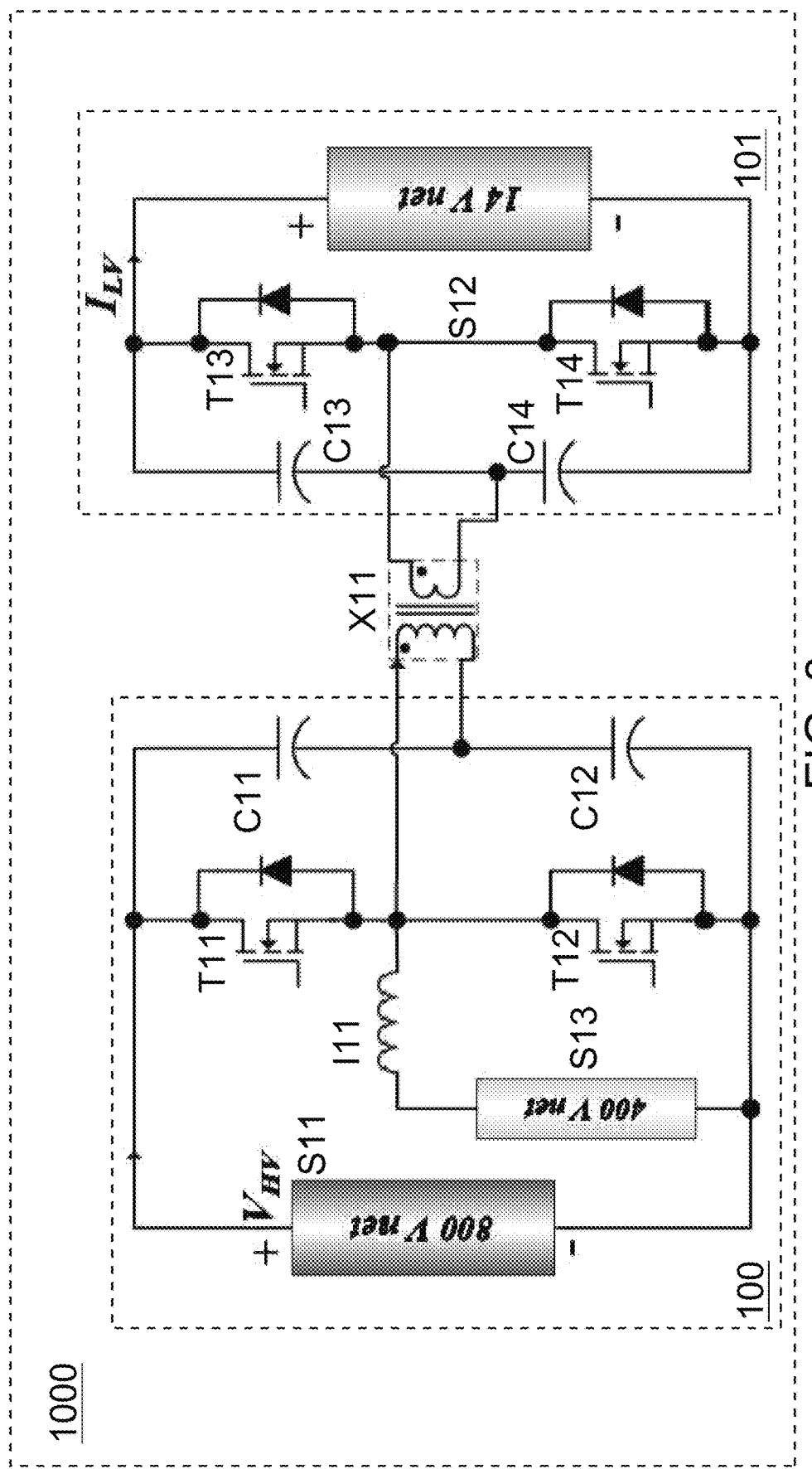
FIG. 3 is an exemplary embodiment of a circuit diagram showing an integrated APM including a buck/boost converter.

FIG. 3 illustrates an exemplary circuit diagram with an APM 1000 with combined converters. In one embodiment, the APM could be employed in an electric vehicle (not shown). The APM circuit comprises of a high voltage (HV) side 100 and a low voltage (LV) side 101. In this exemplary embodiment, an 800V battery (e.g., used for power for propulsion of an electric vehicle) provides the HV supply S11. Other voltage ratings may be employed on the HV side. The HV supply may power various motor(s) for the EV, including the main propulsion motor(s).

The APM includes two power switches T11/T12 on the HV side of the circuit. The two HV power switches T11/T12 are provided to operate the circuit with the required duty ratio. The first power switch T11 is connected to the positive side of the HV supply S11, and the second power switch T12 is connected to the negative side of the HV supply S11. An inductor Iii is located between power switches T11 and T12. During operation of the converter, the HV side switches T11/T12 will operate with a 50% duty ratio. During such a duty cycle, the switches T11 and T12 will only be on during 50% of the operation cycle thus generating a stepped down 400V DC-BUS S13. The 400V power supply may be provided to various AC powered components via an inverter and including an optional filter to provide AC power for supplying various components requiring AC power.

In this exemplary embodiment a 14V supply S12 is provided on the LV side 101 of the APM. Other suitable voltages may be employed on the LV side 101, but in this embodiment a typical voltage (e.g., 11-14 volts) used in automobiles is provided. The LV side may be used to provide power for the various accessories used in electric vehicles. In order to reduce or eliminate the possibility of electric shock, galvanic isolation is needed between the HV and LV side of the APM. A transformer X11 is provided to transfer power between the HV side 100 and LV side 101. The power transfer occurs via phase shift control on the primary side (HV side 100) and secondary side (LV side 101) as the provided power switches T11-T14 are used to enable a buck mode as power is transferred from 400V to 12V. The transformer may be a high frequency transformer and may be of a core or shell form. The turn ratio of the transformer can be adjusted for the system's requirements to provide correct voltages for the system.

Two capacitors C11 and C12 are employed to split the voltages on the primary side (HV side 100) of the transformer X11. The transformer may also operate in a boost mode using a change in the phase shift angle in order to transfer energy from the LV side 101 to the HV side. Two capacitors C13 and C14 are also provided on the secondary side (LV side 101) to split the transformed voltage. The four capacitors C11-C14 are provided to split and smooth out the DC-BUS voltages on both sides 100 and 101 of the APM.

Figure 4:
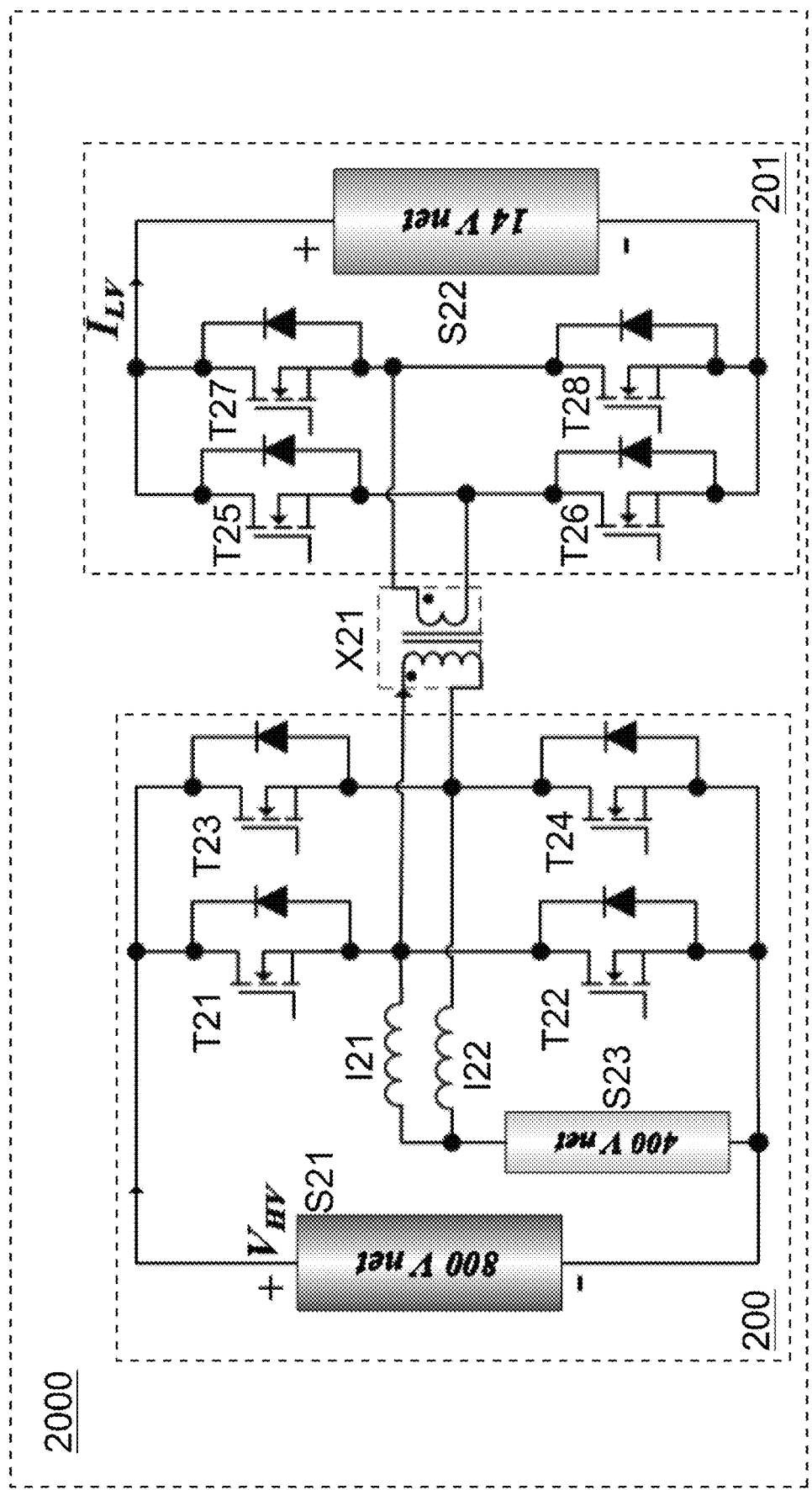
FIG. 4 is another exemplary embodiment of a circuit diagram showing an integrated APM including a buck/boost converter with H bridge converters.

FIG. 4 illustrates another exemplary circuit diagram of the APM 2000 with combined converters. In the configuration shown in FIG. 3, H bridge converters are used on both the primary side (HV side 200) and the secondary side (LV side 201) of the APM. The DC-BUS splitting capacitors employed in the embodiment shown in FIG. 2 are eliminated in the embodiment of the APM shown in FIG. 3. In this exemplary embodiment, two 800/400V converters work in parallel. The configuration may include a phase difference between the two legs (T21/22—Leg 1, T23/24—Leg 2) that will reduce current ripples when the APM is supplying loads connected to the 400V bus.

Figure 5:
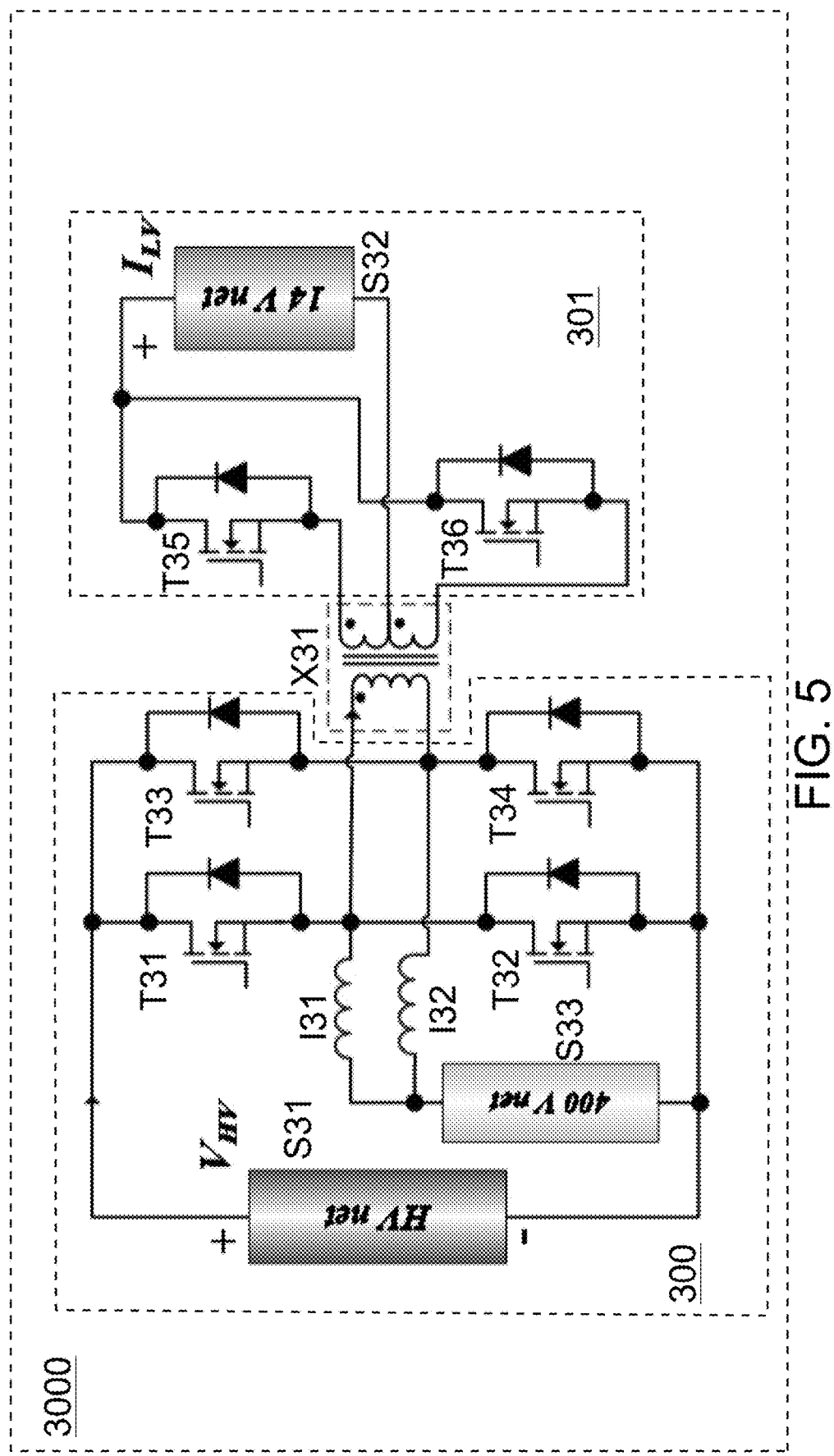
FIG. 5 is another exemplary embodiment of a circuit diagram showing an integrated APM including a buck/boost converter with a primary side H bridge converter with a center-tap transformer.

FIG. 5 illustrates another exemplary circuit diagram for an APM 3000 with combined converters. In the configuration shown in FIG. 4, only the primary side (HV side 300) includes H bridge converters. A tap may be used to configure the transformer to contain a select number of windings needed to step the voltage down to the required amount. A center tap transformer X31 may be used to reduce losses at the secondary side (LV side 301).

Any of the power switches described herein may be controlled using a pulse width modulation (PWM) control circuit, although other control techniques such as ripple regulators or a pulse frequency modulation (PFM) control circuit may be used as well. Furthermore, switches may employ a power switching device such as a power MOSFET device. Specifically, the switch may be an n-channel enhancement MOSFET device. Furthermore, in any of the embodiments disclosed above, power can flow from the LV side (101/201/301) to the HV (100/200/300) side to power the HV power supply (S11/21/31) in a boost mode via a change in the phase shift angle of the circuits. The HV power supply (S11/21/31) may be of any desired voltage, an 800V is disclosed in the exemplary embodiments. The stepped down DC-BUS (S13/23/33) for the embodiments disclosed above can be of any percentage that the circuit permits, a 400V is disclosed in the exemplary embodiments. The duty ratio of the power switches of the converter circuit will determine amount stepped down.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the combined converter circuit is illustrative only. The various embodiments disclosed herein are not mutually exclusive. For example, where practical, elements of the circuits shown in FIGS. 2-4 may be combined to provide configurations desirable for certain vehicle applications.

Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A power module for an electric vehicle comprising:
a main power supply configured to supply DC power;
a first bi-directional converter configured to step down a main power supply voltage from the main power supply to a stepped down DC-BUS;
a second bi-directional converter electrically coupled with the first bi-directional converter, wherein the second bi-directional converter is configured to convert the main power supply voltage to charge an auxiliary power supply;
a first switch selectively connecting the main power supply to the DC-BUS, wherein a DC-BUS voltage is lower than the main voltage and higher than an auxiliary power supply voltage;
a second switch in series connection with the first switch; and
wherein the first bi-directional converter includes an inductor configured to filter current to the DC-BUS, wherein the inductor is parallel to the second switch.

2. The power module of claim 1, further comprising a transformer between the main power supply and the auxiliary power supply a first H-bridge converter on a primary side of the transformer.

3. The power module of claim 2, further comprising a second H-bridge converter on a secondary side of the transformer.

4. The power module of claim 1, further comprising a boost mode wherein the auxiliary supply charges the power supply.

5. The power module of claim 1, wherein the first switch is a first n-channel MOSFET and the second switch is a second n-channel MOSFET; and
   wherein a source of the first n-channel MOSFET is electrically coupled to a drain of the second n-channel MOSFET.

6. The combined converter circuit of claim 1, wherein the first bi-directional converter operates at a 50% duty ratio.

7. The combined converter circuit of claim 1, wherein the DC-BUS voltage is half the main power supply voltage.

8. The combined converter circuit of claim 1, wherein a pair of capacitors split the voltage of the stepped down DC-BUS.

9. An electric vehicle having an auxiliary power module comprising:
   a propulsion motor configured to drive the electric vehicle;
   a main power supply to power the propulsion motor through a DC-BUS;
   a first bi-directional converter configured to step down a main power supply voltage from the main power supply to the DC-BUS;
   a second bi-directional converter electrically coupled to the first bi-directional converter, wherein the second bi-directional converter is configured to convert the main power supply voltage to charge an auxiliary power supply;
   a first switch selectively connecting the main power supply to the DC-BUS, wherein a DC-BUS voltage is lower than the main power supply voltage and higher than an auxiliary power supply voltage;
   a second switch in series connection with the first switch; and
   wherein the first bi-directional converter includes an inductor configured to filter current to the DC-BUS, wherein the inductor is parallel to the second switch.

10. The electric vehicle of claim 9, further comprising a transformer between the main power supply and the auxiliary power supply a first H-bridge converter on a primary side of the transformer.

11. The electric vehicle of claim 10, further comprising a second H-bridge converter on a secondary side of the transformer.

12. The electric vehicle of claim 9, further comprising a boost mode wherein the auxiliary supply charges the power supply.

13. The electric vehicle of claim 9, wherein the first switch is a first n-channel MOSFET and the second switch is a second n-channel MOSFET.

14. The electric vehicle of claim 13, wherein a source of the first n-channel MOSFET is electrically coupled to a drain of the second n-channel MOSFET.

15. The electric vehicle of claim 9, wherein the first bi-directional converter operates at a 50 percent duty ratio.

16. The electric vehicle of claim 9, wherein the DC-BUS voltage is half the main power supply voltage.

17. The electric vehicle of claim 9, wherein a pair of capacitors split the voltage of the DC-BUS.

* * * * *